June 26, 1962  M. J. ANDREW  3,040,901
DISH RACK FOR DOMESTIC APPLIANCE
Filed May 29, 1961  3 Sheets-Sheet 1
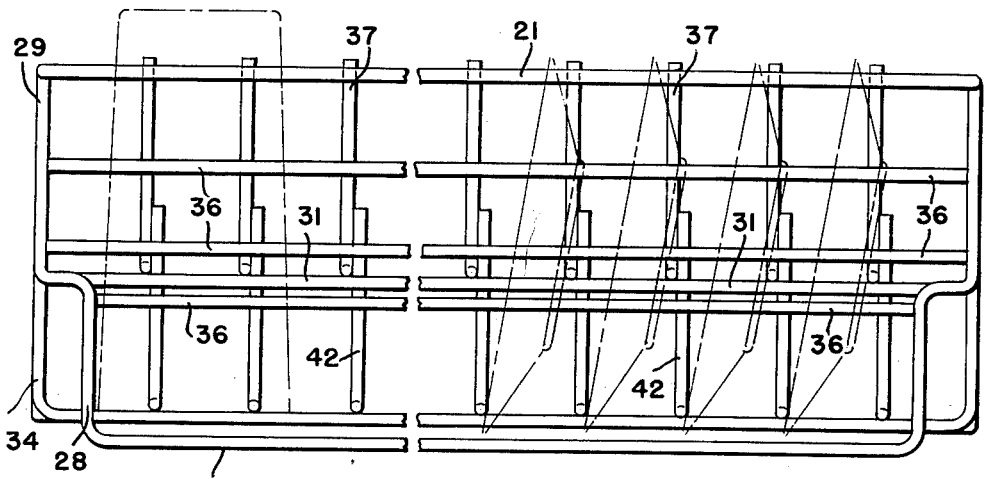
Fig. 5
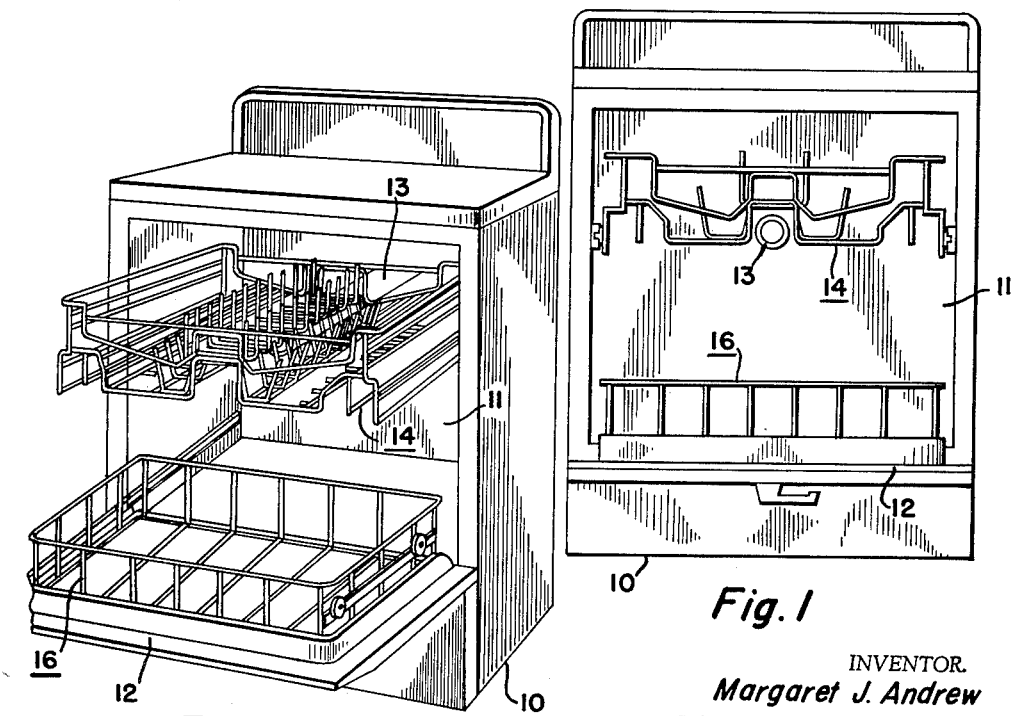
Fig. 2
Fig. 1
INVENTOR.
Margaret J. Andrew
BY
Lloyd M. Keighley
Her Attorney

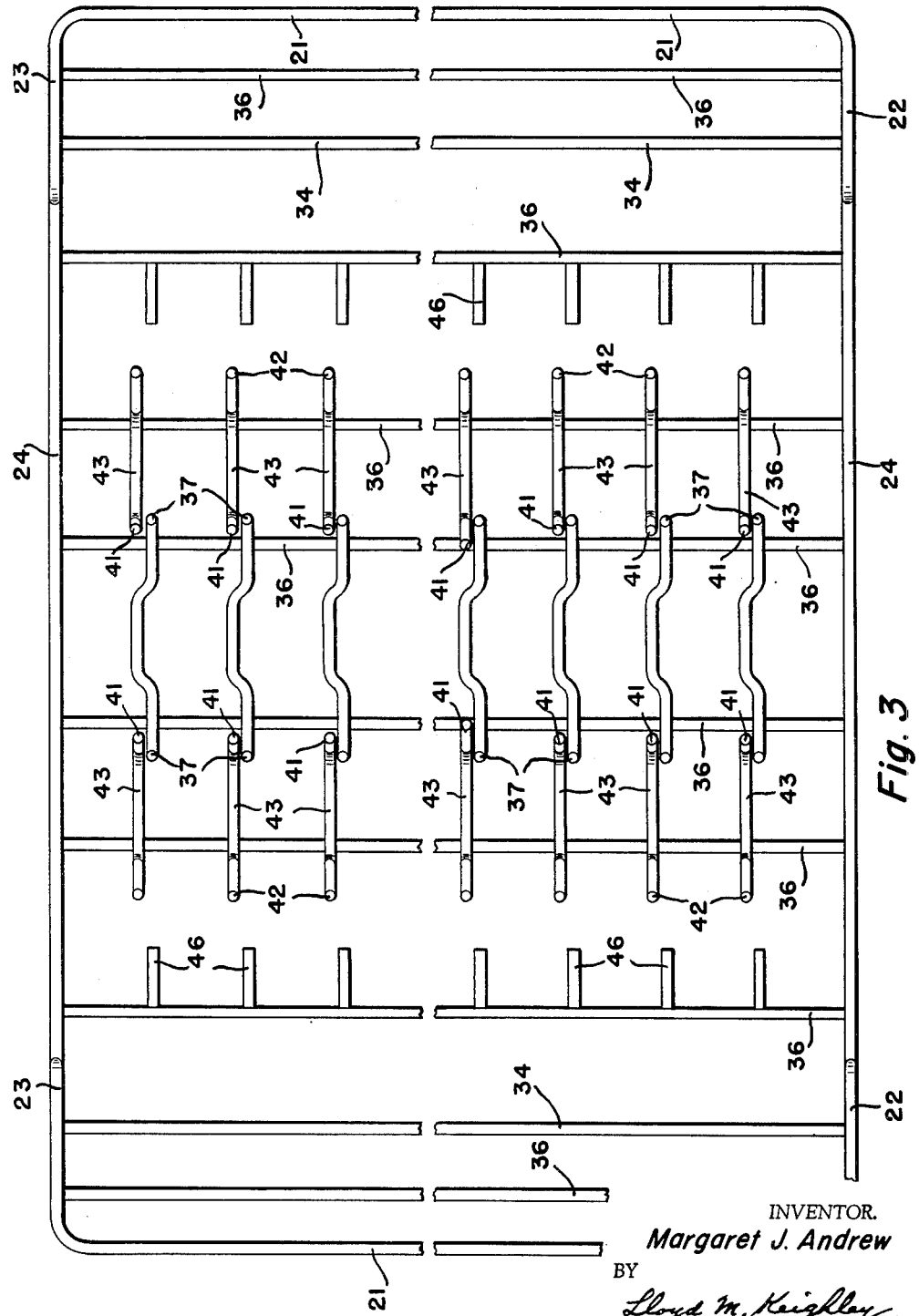

United States Patent Office 3,040,901
Patented June 26, 1962

3,040,901
DISH RACK FOR DOMESTIC APPLIANCE
Margaret J. Andrew, Dayton, Ohio, assignor to General Motors Corporation, Detroit, Mich., a corporation of Delaware
Filed May 29, 1961, Ser. No. 113,347
4 Claims. (Cl. 211—41)

This invention relates to a dish rack for use in a domestic appliance such as a dishwashing machine.

I am aware of the fact that there are many different design dish racks and such racks must be of a special design for use in dishwashers and my present invention deals with increasing the utility of an upper dish rack for use in a washing machine of the front opening type having a horizontal liquid spray tube or element in the center of the washing compartment projecting inwardly thereinto from the compartment back wall and in this respect my innovation is an improvement over the rack structure disclosed in Patent No. 2,910,207 issued in my name on October 27, 1959.

An object of my invention is to provide a dish rack with improved supporting means for holding a large quantity of relatively small articles of tableware or utensils in a compact manner in positions therein with respect to a liquid spray tube of a dishwashing machine so as to be effectively washed and rinsed, particularly without leaving water or detergent marks on the tableware or utensils.

Another object of my invention is to provide a dish rack which straddles a liquid spray tube in a dishwashing machine and has posts or upright spines arranged in an article support section of the rack for supporting various types of utensils at different times or a plurality of similar utensils at one time depending upon the character of the soiled tableware to be washed.

In carrying out the foregoing objects it is a still further and more specific object of my invention to provide a dish rack for supporting means therein or thereon which means at one time invertedly receives thereover and is encompassed by a plurality of drinking glasses or other deeply concaved container utensils such as bowls and which means also cooperates in dividing an article support section in the rack into subsections for at another time receiving and holding a row of saucers or the like in spaced-apart upright angular spill-out position closely adjacent a liquid spray tube or element of a dishwashing machine.

Further objects and advantages of the present invention will be apparent from the following description, reference being had to the accompanying drawings wherein a preferred embodiment of the present invention is clearly shown.

In the drawings:

FIGURE 1 is a front view of a dishwashing machine with the forward door thereof open showing my improved dish rack associated with a spray tube in the washing compartment thereof;

FIGURE 2 is a perspective view of the machine disclosed in FIGURE 1 showing my improved dish rack moved part may out of the washing machine compartment;

FIGURE 3 is an enlarged broken top view of my improved rack removed from the washing machine;

Figure 4:
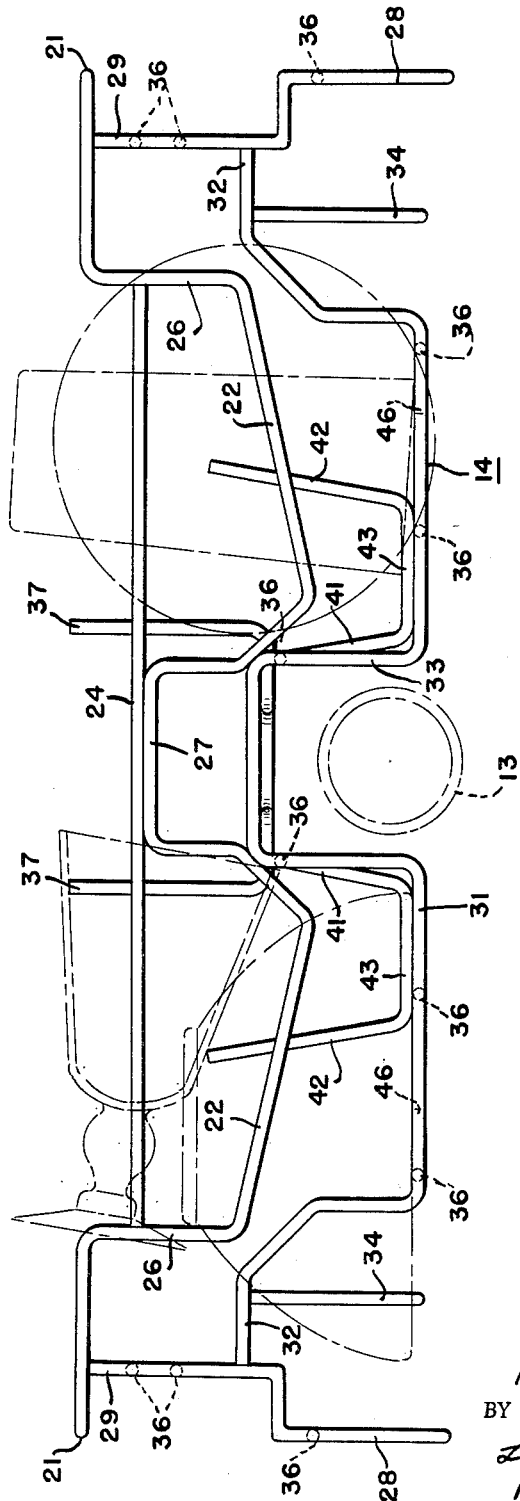
FIGURE 4 is a front view of the rack showing alternate arrangements of supporting different shaped utensils on opposite sides thereof; and, FIGURE 5 is a side view of the rack showing post members thereon cooperating to hold a row of saucers in an article support section thereof in liquid spill-out position.

In the present application wherein I employ the term utensils, it is to be understood that this word is used in its broad sense to include kitchenware and tableware of various types such as metal, glass or ceramic dishes, bowls, cups, saucers, tumblers and drinking glasses or culinary items of this character.

Referring to the drawings wherein the present invention is illustrated, I show in FIGURE 1 thereof a dishwasher or washing machine including a cabinet 10 having a washing compartment 11 therein provided with a front access opening normally closed by a door 12 horizontally hinged upon the cabinet for vertical swinging movement. An elongated liquid spray tube or element 13 is located centrally within compartment 11 and extends or projects forwardly therein from the back compartment wall for discharging a plurality of streams of water in various directions therefrom into the compartment onto, over and into utensils adapted to be placed in compartment 11. Separate independent upper and lower racks, generally represented by the reference numerals 14 and 16 respectively in FIGURES 1 and 2, are slidably or rollably mounted, by appropriate glides or the like, in any suitable or conventional manner upon side walls of compartment 11 for movement relative to one another and to spray tube or element 13 part way out of the compartment (see FIGURE 2). These racks 14 and 16 provide utensil supporting arrangements within compartment 11 for tableware or kitchenware to be washed therein. Suitable drain means is provided in the bottom of compartment 11 to carry away water discharged or sprayed thereinto by spray tube or element 13. The present invention is directed to an improved upper utensil supporting rack in a dishwashing machine of the type more fully illustrated and described in detail in the Abresch et al. Patent No. 2,734,520 dated February 14, 1956, and this patent is referred to for a better understanding of a dishwashing machine herein only briefly described. My invention specifically relates to an upper utensil rack of such a dishwasher, the versatile or alternate portions thereof and the association or location of these portions with respect to a liquid spray tube in the center of a washing compartment of the washer or machine.

Referring now to FIGURES 3, 4 and 5 of the drawings, the improved upper rack structure 14 comprises or includes a perimeter metal wire having straight horizontal side rails 21 and integral zig-zagged-shaped similar front and rear bars 22 and 23 respectively (see FIGURE 4). A straight wire 24, at both the front and rear of rack 14, has its ends secured, as by welding, to downwardly bent portions 26 of the perimeter wire and also has its central part secured to a raised center bar portion 27 of the perimeter wire. A bent U-shaped wire 28 located at each side of rack 14 has the ends 29 of its upstanding legs welded to the upper perimeter wire intermediate side rails 21 and downwardly bent portion 26 thereof. Another zig-zagged-shaped wire 31 at both the front and rear of rack 14, has its ends 32 welded to U-shaped side wires or rails 28 intermediate the bottom and the ends 29 thereof. The central part of wires or bars 31 is bent upwardly with respect to the bottom portion of rack 14 into a multifarious or inverted U-shaped formation, as at 33, for a purpose to be hereinafter described, and the upper part of this formation is welded to legs of the raised part 27 of bar or wire 22. There are also two U-shaped wires 34 at sides of rack 14 inwardly of U-shaped wires 28 with the upper end of legs of wires 34 welded to wires or bars 31 inwardly of the ends 32 thereof. The rack 14 also comprises or includes a plurality of horizontal wires 36 arranged in spaced-apart relation relative to one another some of which provide bottom rails and others of which are disposed over each other at sides of rack 14 to provide side rails therefor. Bottom and side rails 36, together with the front and rear bars 22, 24 and 31, define or provide rack 14 with borders or bordering portions of a basket-like receptacle therein. A total of twelve straight horizontal rails 36 are incorporated in the rack structure 14. Two of the wire rails 36 centrally of sides of rack 14 have their ends welded and secured to front and rear bars 31 near the top thereof or approximately at the juncture of legs with the base portion of the raised inverted U-shaped formation therein. The two elevated spaced-apart central rails 36 and the inverted U-shaped or multifarious formation 33 in front and rear bars 31 cooperate to provide the underside of rack 14 with an elongated unobstructed raised portion or channel-like portion adapted to straddle the spray tube or element 13 in the dishwashing machine 10 and, in addition, the elevated central rails 36 partition the interior of the basket-like receptacle of the rack into side-by-side or opposed article support sections. Rack 14 also comprises or includes a first set or a plurality of U-shaped wire members spaced apart along the two elevated central rails 36 with the base of the U of these members spanning and being welded thereto and having their legs extending upwardly therefrom to provide rows of posts or spines 37, each of which is aligned with respect to one another. The dish rack of the present disclosure further includes or comprises a second set or a plurality of substantially U-shaped post members within each or at least one of the opposed side-by-side article support sections of the receptacle in rack 14 which are adapted to increase the versatility and utility thereof as will be hereinafter explained. This second set of U-shaped post members is arranged in a row and each of them are spaced apart with respect to one another with one leg 41 of each U welded conjointly to a central rail 36 and to the lower part of a member of the first set of post members. The other leg 42 of each of the members of the second set thereof is disposed within an article support section of the basket-like receptacle of rack 14 spaced laterally from the posts or spines 37 of the first set of U-shaped post members. It is to be noted that the end of legs 42 of the second set of U-shaped members is lower than or terminates below the upper end of posts or spines 37. The base portion 43 of each of the second set of U-shaped post members has a part thereof welded to a bottom rail 36 next adjacent the central elevated rails. By referring to FIGURE 3 of the drawings it will be noted that the post members of the sets thereof are substantially aligned transversely of the receptacle of rack 14 and cooperate with each other in dividing at least one or both of the article support sections of the basket receptacle thereof into unobstructed subsections from front to rear of the rack. A plurality of spaced-apart short fingers or studs 46 have one end thereof secured to bottom rail 36 located at sides of the bottom rail next adjacent the central elevated rails. These fingers or studs are disposed in the same horizontal plane with the lowermost rails 36 and they project toward the spray element straddling portion of rack 14. Studs or fingers 46 cooperate with the two horizontal rails at either end thereof to prevent saucers or small salad plates and the like, placed in an upright position within the subsections of article support sections of rack 14, from sliding or shifting angularly therein, upon moving the rack, with respect to a line extended transversely thereacross. Rack 14 may, if desired, also include removable subreceptacle forming means pivotally mounted upon sides thereof for providing same with auxiliary coffee or tea cup supports as has heretofore been conventional in or on such racks. All wire members, rails and rods of rack 14 are preferably round and are coated with some suitable water and detergent resisting substance such as rubber or vinyl material one of which, vinyl plastisol, is common. The second set or plurality of U-shaped post members and their cooperation with the posts 37 have special significance according to my invention.

The improved rack construction disclosed for the interior of a washing compartment of a dishwasher machine is of a character suitable to receive various dishes, saucers, cups, drinking glasses, and bowls used and soiled in the serving of ordinary meals. In addition, the rack has ample space thereon or therein to receive or accommodate an unusual number of similar utensils or a single kind thereof used and soiled during an iced tea, snack or cocktail party. For example, and assuming that the owner of a dishwashing machine equipped with an upper dish rack of the type disclosed has a party at which quite a number of soiled glasses in the serving of drinks, saucers in the serving of meat or cheese cuts and tumblers or bowls in the serving of nuts or other tasty delicacies and it is desired to wash all of these utensils at one time in the dishwasher the necessity of carrying out two or more washing operations is eliminated. I show in FIGURE 4 of the drawings at one side of rack 14 an odd-shaped tumbler or goblet in dot-dash lines with its open end fitted over two of the posts 37 and supported near its other end upon two of the posts 42. At this same side of the rack I show a bowl or the like, representing a deeper concaved vessel or container, invertedly supported on the bottom of rack 14 over posts 42 which bowl encloses or encompasses these posts so that they do not interfere with placing such containers on the rack open at their lower portion to streams of water directed from spray tube or element 13. I also show, by dot-dash lines in FIGURES 4 and 5, on the other side of rack 14 a large glass, such as a malted milk or highball glass, over and enclosing or encompassing front posts 42 and a row of shallow saucers, saucer-like plates such as small salad plates or the like therebehind supported in the article supporting section of the basket-like receptacle of the rack within borders thereof. The saucers or salad plates of the row thereof on rack 14 are supported or cradled on two of the bottom rails 36 in spaced-apart relation to one another in a tilted or upright angular liquid spill-out position, one in each of the unobstructed transversely extending subsections of the article support. The saucers or salad plates are located closely adjacent spray tube 13 out of contact with one another and each abut or rest, while supported or cradled on bottom rails 36 of rack 14, near upper portions thereof at two points against the posts 37 and 42 and bear at a lower point thereon against a stud or fingers 46. Placing or positioning of saucers or small shallow salad plates in the subsections of rack 14, as described, holds them stationary during movement of the rack since fingers or studs 46, together with their two-point abutment with posts 37 and 42, prevent them from shifting or swinging angularly with respect to a straight line extended transversely of the rack. By virtue of aligning the posts or post members 37 and 42 transversely of rack 14, to provide the subsections from front to rear of the rack within the article support sections thereof, these sets of posts serve at one time to receive thereover and locate certain utensils in the rack and to also cooperate one with the other for at another time holding saucers or the like, at two spaced-apart points above the receptacle bottom rails, in a row on the rack adjacent the straddling spray element portion thereof. This cooperation of posts 37 and 42 of the present rack 14 is unique in that saucers or salad plates could not heretofore be properly supported in an article support section of a rack of this character in a row or rows therein to be effectively cleansed and rinsed. Due to the limited space or clearance between the top of washing compartment 11 of machine 10 and the top of rack 14 it is feasible to support short glasses in an inverted liquid spill-out position over posts 37 at one side of the rack, taller glasses over posts 42 and/or a row of saucers or small plates in subsections of article support sections of the rack. Smaller and deeper dishes such as coffee or tea cup saucers may be supported in an upright angular row within subsections of the article support sections of rack 14, if desired, or these smaller saucers may be positioned intermediate posts 37 on the two elevated central rails 36 while larger diametered utensils as dinner plates, pots or pans are to be placed in the lower rack 16 of machine 10.

By the present disclosure it should be apparent that I have provided an improved upper dish rack for a dishwashing machine which is capable of selectively receiving different types of tableware and/or quite a large number of similar types of tableware as the occasion may present itself. The articles of tableware are supported on the rack in a manner to insure water streams emitted from the spray tube of the machine entering each article so that it is thoroughly cleansed, rinsed and effectively drained. A woman familiar with loading dish racks in a dishwashing machine and particularly the upper rack therein will recognize that my improved rack is versatile in affording widely diversified utensil support arrangements or combinations to thereby increase its utility over known dish racks employed in dishwashers in the locality therein as herein disclosed. By providing the interior of an article support section of a dish rack with upright posts or post members which do not at one time interfere with properly supporting tableware or kitchenware thereon or therein with relation to a spray tube of a dishwashing machine and which posts or post members at another time cooperate with other posts or post members on the rack to support a large quantity of similar tableware is unique in the art and should be welcomed by users of such machines.

While the embodiment of the present invention as herein disclosed constitutes a preferred form, it is to be understood that other forms might be adopted.

What is claimed is as follows:

1. A rack for use within a compartment of a dish washing machine having an elongated spray element projecting forwardly from the compartment back wall substantially at a right angle relative thereto, said rack including spaced-apart bottom rails extending horizontally between and connected at their ends to front and rear bars, other rails at sides and other bars at the front and rear of said rack disposed one over another defining upstanding borders of a basket-like receptacle above said bottom rails, a central part of the lower front and rear bars being bent upwardly with respect to the bottom of said receptacle into a multifarious formation threat, two of said spaced horizontal rails centrally of the side borders of said receptacle being elevated above adjacent bottom rails with their ends secured to the upper part of said formation, said two central horizontal rails partitioning the interior of said basket-like receptacle into side-by-side article support sections and cooperating with the formation in said lower front and rear bars to provide the underside of said rack with an elongated unobstructed raised portion adapted to straddle the spray element in said compartment of the machine, said rack also including a first set of spaced-apart post members secured to and arranged in a row on one of said central elevated rails, said rack further including a second set of spaced-apart post members arranged in a row spaced laterally from said first set thereof within one of said article support sections of the basket-like receptacle at the side of said one central elevated rail, each post member of said second set being substantially aligned with each post member of said first set thereof transversely of said receptacle and dividing said one article support section into subsections from front to rear of the rack, the post members of said second set serving to at one time invertedly receive thereover and be enclosed by drinking glasses or other deeply concaved containers while supported on bottom rails of said one article support section of the receptacle within borders thereof, and said post members of the first and second sets thereof at another time cooperating to hold a row of saucers or the like supported on bottom rails of said one article support section of the receptacle within said subsections at two spaced-apart points in an upright angular liquid spill-out position.

2. A rack for use within a compartment of a dish washing machine having an elongated spray element projecting forwardly from the compartment back wall substantially at a right angle relative thereto, said rack including spaced-apart bottom rails extending horizontally between and connected at their ends to front and rear bars, other rails at sides and other bars at the front and rear of said rack disposed one over another defining upstanding borders of a basket-like receptacle above said bottom rails, a central part of the lower front and rear bars being bent upwardly with respect to the bottom of said receptacle into an inverted U-shape formation thereat, two of said spaced horizontal rails centrally of side borders of said receptacle being elevated above adjacent bottom rails with their ends secured to said front and rear bars at the juncture of legs with the inverted base of said U-shape formation thereof, said two central elevated rails partitioning the interior of said basket-like receptacle into side-by-side article support sections and forming with said formation on unobstructed channel-like portion raised about the bottom thereof adapted to straddle the spray element in said compartment of the machine, said rack also including a plurality of spaced-apart U-shaped members secured to said central elevated rails with the legs thereof providing rows of posts therealong, said rack further including a plurality of spaced-apart post members secured thereto and disposed in a row spaced laterally from said U-shaped members within at least one of said article support sections of the basket-like receptacle, the top of said post members being below the top of posts on said U-shaped members and serving to at one time invertedly receive thereover and be enclosed by drinking glasses or other deeply concaved containers while supported on bottom rails of said one article support section of the receptacle within borders thereof, each post of said U-shaped members at the side of said one article support section being substantially aligned with each post of the post members transversely of said receptacle and dividing said one article support section into subsections from front to rear of the rack, said post members serving to at one time invertedly receive thereover and be enclosed by drinking glasses or other deeply concaved containers while supported on bottom rails of said one article support section of the receptacle within borders thereof, and the posts on said U-shaped members along the side of said one article support section at another time cooperating with said post members to hold a row of saucers or the like supported on said receptacle bottom rails at two spaced-apart points thereabove within said subsections in an upright angular liquid spill-out position.

3. A rack for use within a compartment of a dish washing machine having an elongated spray element projecting forwardly from the compartment back wall substantially at a right angle relative thereto, said rack including spaced-apart bottom rails extending horizontally between and connected at their ends to front and rear bars, other rails at sides and other bars at the front and rear of said rack disposed one over another defining upstanding borders of a basket-like receptacle above said bottom rails, a central part of the lower front and rear bars being bent upwardly with respect to the bottom of said receptacle into a multifarious formation thereat, two of said spaced horizontal rails centrally of the side borders of said receptacle being elevated above adjacent bottom rails with their ends secured to the upper part of said formation, said two central horizontal rails partitioning the interior of said basket-like receptacle into side-by-side article support sections and cooperating with the formation in said lower front and rear bars to provide the underside of said rack with an elongated unobstructed raised portion adapted to straddle the spray element in said compartment of the machine, said rack also including a double row of spaced-apart posts extending upwardly from said raised spray element straddling portion thereof and other rows of spaced-apart posts one row of which is spaced laterally from each side of said double row of posts and extend upwardly from said receptacle bottom rails within the article support sections of the rack, each post of the rows thereof being substantially aligned transversely of the receptacle with the posts of said other rows dividing said article support sections into subsections from front to rear of said rack, the top of posts in said article support sections being terminated below the top of posts extending upwardly from said raised spray element straddling portion of the rack and serving to at one time invertedly receive thereover drinking glasses or the like, and said posts in said article support sections cooperating with posts extending upwardly from said raised spray element straddling portion of said rack to at another time hold a row of saucers within said subsections thereof at two spaced-apart points above bottom rails of said basket-like receptacle in an upright angular liquid spill-out position.

4. A dish rack as defined by claim 3 having short horizontal studs secured in spaced-apart relation to and projecting at a right angle from one of the bottom rails supporting the saucers for engagement thereby to prevent angular shifting thereof while positioned in a subsection of an article support section of the rack.

No references cited.